United States Patent Office 3,234,216
Patented Feb. 8, 1966

3,234,216
ACETALS AND KETALS OF 3-ALKOXY-6-
HALO-Δ$^{3,5}$-PREGNADIENES
Patrick A. Diassi, Westfield, and Gerald W. Krakower, Elizabeth, N.J., assignors to Olin Mathieson Chemical Corporation, New York, N.Y., a corporation of Virginia
No Drawing. Filed May 25, 1964, Ser. No. 370,121
9 Claims. (Cl. 260—239.55)

This invention relates to the production of compounds of the formula

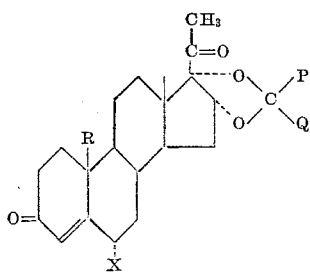

wherein X is halogen (bromo or chloro); R is hydrogen or methyl; P is hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; or together with the carbon to which they are joined P and Q is a monocyclic cycloalkyl or monocyclic heterocyclic radical.

The compounds of this invention possess progestational activity and may be administered in place of progesterone in the treatment of habitual abortion, the dosage and/or concentration being adjusted for the relative potency of the particular steroid.

The final products of this invention may be prepared by the process of this invention beginning with compounds of the formula

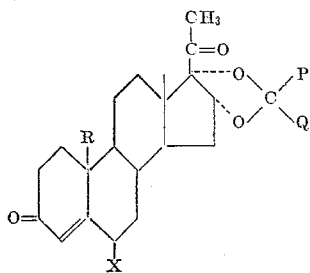

wherein R, X, P and Q are as hereinbefore defined. The starting material, wherein R is hydrogen, may be prepared according to the procedures set forth in application, Serial No. 318,503, filed October 24, 1963, in the name of Patrick Andrew Diassi.

The process of the instant invention may be represented by the following equations wherein X, R, P and Q are as hereinbefore defined, and R' is alkyl or cycloalkyl:

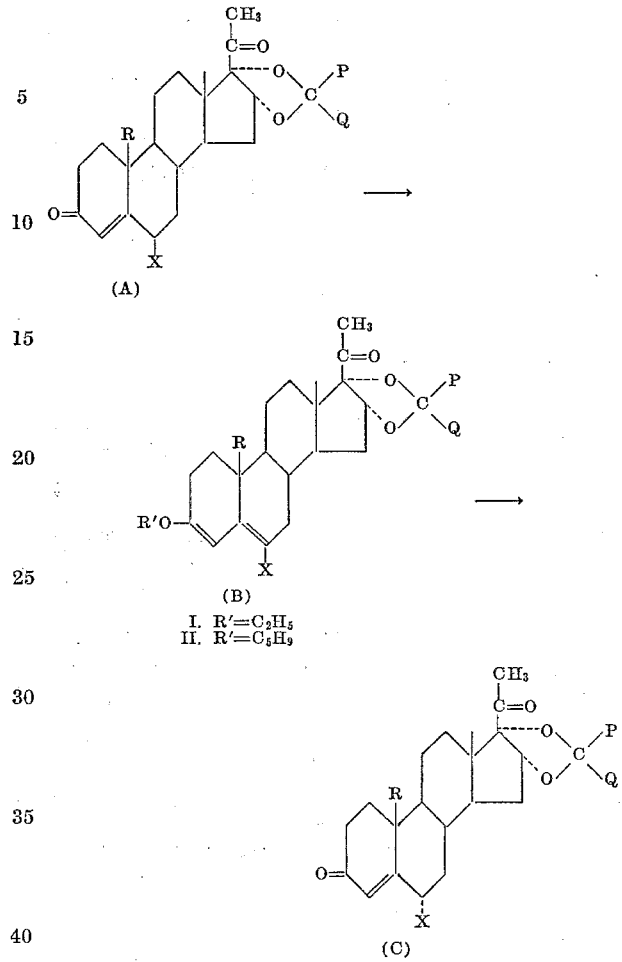

The starting materials are first treated with an alkyl orthoformate, for example, ethylorthoformate, in an acid medium to obtain the 3-enol ether derivatives of the starting materials (Compounds I) which are new compounds of this invention.

The 3-enol derivatives (Compounds I) may then be treated with a lower cycloalkanol, for example, cyclopentanol or cyclohexanol or cyclobutanol, in an acid medium, e.g., toluene-sulfonic acid to yield the 3-lower cycloalkoxy derivatives (Compounds II) which are also new compounds of this invention.

Compounds B in a suitable solvent may then be treated with a mineral acid, for example, a hydrohalic acid such as hydrochloric or hydrobromic acid, at an elevated temperature to yield the 3-keto-6α-chloro final products (Compounds C) of this invention.

The invention may be further illustrated by the following examples:

Example 1.—3-ethoxy-6-chloro-16α, 17α-dimethylmethylenedioxy-Δ$^{3,5}$-19-nor pregnadiene-20-one To a solution of 1.0 grams of 6β-chloro-16α, 17α-dimethylmethylenedioxy-19-norprogesterone in 7.5 ml. of anhydrous dioxane 0.1 ml. of absolute ethanol and 1.0 ml. of ethylorthoformate are added. To this mixture there is added dropwise a solution of 0.035 ml. of sulfuric acid in 0.7 ml. of dioxane. The reaction is left at room temperature for 15 minutes and then neutralized by the addition of 0.6 ml. of pyridine. The solution is then evaporated in vacuo, using no heat to yield an oil, which crystallizes upon addition of methanol. The crystals are filtered and washed with methanol to give 3-ethoxy-6-chloro-16α,17α - dimethylmethylenedioxy - $\Delta^{3,5}$ - 19 - nor pregnadiene-20-one having melting point 146–148° C., $[\alpha]_D^{22}$ —75° (chloroform), $$\lambda_{Max.}^{Alc.}\ 255\ m\mu\ (\epsilon=18,400)$$

*Analysis.*—Calc'd for $C_{25}H_{35}O_4Cl$ (435.01): C, 69.04; H, 8.11. Found: C, 69.12; H, 8.15.

*Example 2.—3-ethoxy-6-chloro - 16α,17α - dimethylmethylenedioxy-$\Delta^{3,5}$-pregnadiene-20-one*

Following the procedure for Example I but substituting 6β-chloro-16α,17α - dimethylmethylenedioxyprogesterone for the 6β-chloro-16α,17α - dimethylmethylenedioxy - 19-norprogesterone there is obtained 3-ethoxy-6-chloro-16α, 17α-dimethylmethylenedioxy-$\Delta^{3,5}$-pregnadiene-20-one having a melting point of 208–209° C., $$\lambda_{Max.}^{Alc.}\ 251\ m\mu\ (\epsilon=24,600)$$

$[\alpha]_D$—74.3 (chloroform).

*Analysis.*—Calc'd for $C_{26}H_{37}O_4Cl$: C, 69.55; H, 8.31. Found: C, 69.45; H, 8.30.

*Example 3.—3-ethoxy-6-chloro-16α,17α - (β - methyl - α-phenylmethylenedioxy)-$\Delta^{3,5}$-pregnadiene-20-one*

Following the procedure for Example 1 but substituting 6β-chloro-16α,17α-(β-methyl-α - phenylmethylenedioxy)-progesterone for the 6β-chloro-16α,17α - dimethylmethylenedioxy-19-norprogesterone there is obtained 3-ethoxy-6-chloro,16α,17α-(β-methyl-α-phenylmethylenedioxy) - $\Delta^{3,5}$-pregnadiene-20-one.

*Example 4.—3-ethoxy-6-chloro-16α,17α-(β-methyl-α-phenylmethylenedioxy)-$\Delta^{3,5}$-19-norpregnadiene-20-one*

Following the procedure of Example 1 but substituting 6β - chloro-16α,17α-(β-methyl-α-phenylmethylenedioxy)-19-norprogesterone for the 6β-chloro-16α,17α-dimethylmethylenedioxy-19-norprogesterone there is obtained 3-ethoxy - 6 - chloro-16α,17α-(β-methyl-α-phenylmethylenedioxy)-$\Delta^{3,5}$-19-norpregnadiene-20-one.

*Example 5.—3-cyclopentyloxy-16α,17α-dimethylmethylenedioxy-$\Delta^{3,5}$-pregnadiene-20-one*

A solution of 1.242 g. of 3-ethoxy-16α,17α-dimethylmethylenedioxy-$\Delta^{3,5}$-pregnadiene-20-one and 100 mg. of p-toluenesulfonic acid in 200 ml. of benzene, containing 2.58 g. of cyclopentanol is distilled slowly for one hour. The reaction mixture is cooled and neutralized with 0.4 ml. of pyridine and the solvent evaporated. Crystallization of the residue from ethanol-methylene chloride gives 813 mg. of 3-cyclopentyloxy-16α,17α-dimethylmethylenedioxy-$\Delta^{3,5}$-pregnadiene-20-one having melting point 188–190° C.

$$\lambda_{Max.}^{EtOH}\ 243\ m\mu\ (\epsilon=25,300)$$

$[\alpha]_D^{22}$—88.7° (chloroform).

*Analysis.*—Calc'd for $C_{29}H_{42}O_4$: C, 76.61; H, 9.31. Found: C, 76.63; H, 9.32.

*Example 6.—3-cyclopentyloxy-6-chloro-16α,17α-dimethylmethylenedioxy-$\Delta^{3,5}$-pregnadiene-20-one*

Following the procedure of Example 5 but substituting 3 - ethoxy-6-chloro-16α,17α-dimethylmethylenedioxy-$\Delta^{3,5}$-pregnadiene-20-one for the 3-ethoxy-16α,17α-dimethylmethylenedioxy-$\Delta^{3,5}$-pregnadiene-20-one there is obtained 3 - cyclopentyloxy - 6-chloro-16α,17α-dimethylmethylenedioxy-$\Delta^{3,5}$-pregnadiene-20-one.

*Example 7.—3-cyclopentyloxy-6-chloro-16α,17α-dimethylmethylenedioxy-$\Delta^{3,5}$-19-norpregnadiene-20-one*

Following the procedure of Example 5 but substituting 3 - ethoxy-6-chloro-16α,17α-dimethylmethylenedioxy-$\Delta^{3,5}$-19-norpregnadiene-20-one for the 3-ethoxy-16α,17α-dimethylmethylenedioxy-$\Delta^{3,5}$-pregnadiene-20-one there is obtained 3 - cyclopentyloxy - 6-chloro-16α,17α-dimethylmethylenedioxy-$\Delta^{3,5}$-19-norpregnadiene-20-one.

*Example 8.—3-cyclopentyloxy-6-chloro-16α,17α-(β-methyl-α-phenylmethylenedioxy)-$\Delta^{3,5}$-pregnadiene-20-one*

Following the procedure of Example 5 but substituting 3 - ethoxy - 6-chloro-16α,17α-(β-methyl-α-phenylmethylenedioxy)-$\Delta^{3,5}$-pregnadiene-20-one for the 3-ethoxy-16α, 17α - dimethylmethylenedioxy - $\Delta^{3,5}$ - pregnadiene - 20-one there is obtained 3-cyclopentyloxy-6-chloro-16α,17α-(β-methyl - α - phenylmethylenedioxy)-$\Delta^{3,5}$-pregnadiene-20-one.

*Example 9.—3 - cyclopentyloxy - 6-chloro-16α,17α-(β-methyl - α - phenylmethylenedioxy)-$\Delta^{3,5}$-19-norpregnadiene-20-one*

Following the procedure of Example 5 but substituting 3 - ethoxy - 6 - chloro-16α,17α-(β-methyl-α-phenylmethylenedioxy)-$\Delta^{3,5}$-19-norpregnadiene-20-one for the 3-ethoxy-16α,17α - dimethylmethylenedioxy - $\Delta^{3,5}$ - pregnadiene-20-one there is obtained 3-cyclopentyloxy-6-chloro-16α,17α-(β - methyl - α-phenylmethylenedioxy)-$\Delta^{3,5}$-19-norpregnadiene-20-one.

*Example 10.—6α-chloro-16α,17α-dimethylmethylenedioxy-19-norprogesterone*

A solution of 100 mg. of 3-ethoxy-6-chloro-16α,17α-dimethylmethylenedioxy - $\Delta^{3,5}$ - 19-norpregnadiene-20-one in 10 ml. of methanol and 1 ml. of 2 N hydrochloric acid is refluxed for 15 minutes. The solution is then diluted with water and extracted with chloroform. The chloroform extracts are evaporated to dryness in vacuo, and the residue plate chromatographed using neutral alumina (Activity V) as adsorbent and chloroform-hexane (1:1, v.:v.) as eluant. The band having an Rf of approximately 0.4 is separated and eluted with ethyl acetate, which on evaporation, in vacuo, and crystallization of the residue gives 31 mg. of 6α-chloro-16α-17α-dimethylmethylenedioxy-19-norprogesterone having a melting point of about 203–205° C., $[\alpha]_D^{22}$+24° (chloroform), $$\lambda_{Max.}^{Alc.}\ 239\ m\mu\ (\epsilon=15,600)$$

*Analysis.*—Calc'd for $C_{23}H_{31}O_4Cl$ (406.96): C, 67.89; H, 7.68. Found: C, 67.95; H, 7.66.

*Example 11.—6α-chloro-16α,17α-(β-methyl-α-phenylmethylenedioxy)-19-norprogesterone*

Following the procedure of Example 10 but substituting 3 - ethoxy - 6 - chloro-16α,17α-(β-methyl-α-phenylmethylenedioxy) - $\Delta^{3,5}$ - 19-norpregnadiene-20-one for the 3-ethoxy - 6 - chloro-16α,17α-dimethylmethylenedioxy-$\Delta^{3,5}$-19-norpregnadiene-20-one there is obtained 6α-chloro-16α, 17α-(β-methyl-α-phenylmethylenedioxy)-19-norprogesterone.

What is claimed is:
1. A compound of the formula

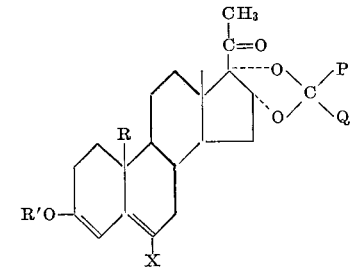

wherein X is halogen; R is selected from the group consisting of hydrogen and methyl; R' is selected from the group consisting of lower alkyl and lower cycloalkyl; P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which are joined P and Q is selected from the group consisting of monocyclic cycloalkyl and monocyclic heterocyclic.

2. 3-ethoxy-6-chloro-16α,17α-dimethylmethylenedioxy-$\Delta^{3,5}$-19-norpregnadiene-20-one.

3. 3-ethoxy-6-chloro-16α,17α-dimethylmethylenedioxy-$\Delta^{3,5}$-pregnadiene-20-one.

4. 3-ethoxy-6-chloro-16α,17α-(β-methyl-α-phenylmethylenedioxy)-$\Delta^{3,5}$-pregnadiene-20-one.

5. 3-ethoxy-6-chloro-16α,17α-(β-methyl-α-phenylmethylenedioxy)-$\Delta^{3,5}$-19-norpregnadiene-20-one.

6. 3-cyclopentyloxy-6-chloro-16α,17α-dimethylmethylenedioxy-$\Delta^{3,5}$-pregnadiene-20-one.

7. 3-cyclopentyloxy-6-chloro-16α,17α-dimethylmethylenedioxy-$\Delta^{3,5}$-19-norpregnadiene-20-one.

8. 3-cyclopentyloxy-6-chloro-16α,17α-(β-methyl-α-phenylmethylenedioxy)-$\Delta^{3,5}$-pregnadiene-20-one.

9. 3-cyclopentyloxy-6-chloro-16α,17α-(β-methyl-α-phenylmethylenedioxy)-$\Delta^{3,5}$-19-norpregnadiene-20-one.

References Cited by the Examiner

UNITED STATES PATENTS

| | | | |
|---|---|---|---|
| 3,009,858 | 11/1961 | Ercoli | 167—65 |
| 3,123,601 | 3/1964 | Diassi | 260—239.55 |
| 3,134,770 | 5/1964 | Fried | 260—239.55 |

LEWIS GOTTS, *Primary Examiner.*

HENRY FRENCH, *Assistant Examiner.*